Patented Apr. 28, 1953

2,636,890

UNITED STATES PATENT OFFICE 2,636,890

METHODS FOR PREPARING PEROXIDES OF UNSATURATED FATTY ACIDS AND THE LIKE

Walter O. Lundberg, Austin, Minn., assignor to Regents of the University of Minnesota, Minneapolis, Minn., a corporation of Minnesota No Drawing. Application July 23, 1948, Serial No. 40,433

7 Claims. (Cl. 260—406)

This invention relates to methods of preparing peroxides of unsaturated fatty acids and of derivatives of fatty acids, and particularly to improvements whereby such peroxides may be prepared in relatively concentrated state. Peroxides of such materials are useful in the plastic and rubber industries and in other fields where organic peroxides are used.

It is an object of the present invention to provide methods for preparing peroxides of unsaturated fatty materials, such as peroxides of unsaturated fatty acids and peroxides of the esters or soaps of such fatty acids, either in concentrated or relatively concentrated form and in relatively pure state.

It is also an object of the invention to provide methods for preparing peroxides of fatty acids and of derivatives of fatty acids more cheaply than by methods now commercially available and to prepare fatty acid peroxides of fatty acid mixtures derived from natural oils or peroxides of the esters or soaps of such fatty acid mixtures.

It is a further object of the invention to provide methods of selectively preparing peroxides of fatty acids or fatty acid derivatives of particular fractions or constituents in natural fatty acid mixtures or from the esters or soaps of such natural fatty acid mixtures and to provide improved methods of separating the fatty acid peroxides so produced.

It is also an object of the invention to provide improved methods of separating peroxides of fatty acids or fatty acid derivatives from the reaction mixtures in which they are prepared and to provide improved methods for the production of peroxides of fatty acids or fatty acid derivatives, either with or without catalysts.

It is a specific object of the invention to provide methods of preparing peroxides of linoleic and linolenic acids and their derivatives, as well as peroxides of oleic and other unsaturated aliphatic acids and their esters or soaps.

Other and further objects of the invention are those inherent in the methods herein described and claimed.

In carrying out the invention there may be utilized as the starting material the fatty acids of unsaturated fatty oils, either in relatively pure state or as made directly from the oil or the esters or soaps of such acids or acid mixtures. Thus, there may be used the fatty acids or esters or soaps of fatty acids derived from naturally occurring oils, such as corn oil, soybean or linseed oils, palm nut oil, fish oils and any other of the fatty oils of vegetable or animal origin which include unsaturated constituents.

The fatty acids of unsaturated animal or vegetable natural oils may be used as the starting material or esters or soaps thereof may be prepared. In many instances the fatty acids, or esters or soaps can conveniently be prepared from the natural oil as a preliminary step. Where the esters are used the aliphatic radical can be of long or short, and either straight or branched chain. It is usually preferable to utilize an aliphatic ester, such as the methyl, ethyl, propyl, butyl or amyl esters, although esters of alcohols with longer carbon chains of either straight chain or branched chain structure are not excluded. Where the soaps are used it is preferable to use an alkali soap, such as sodium or potassium soaps of the fatty acids.

The fat or oil is converted to the desired derivative by any one or more of several well known and widely utilized reactions. Thus, for example, the free fatty acids may be prepared by saponification of the oil and acidification of the soaps according to standard methods. Esters of the fatty acids may be made by esterification with alcohol. Concentrates of the most desired acids, esters or other derivatives may be made by known methods of fractionation, crystallization, distillation, chromatographic adsorption, etc. Separation or concentration of desired starting material fatty acids may be made also by chemical means.

The starting material, whether in the form of an acid, ester or soap is freed from naturally occurring antioxidants. The naturally occurring oxidation inhibitors are usually incidentally removed when the fatty acids are prepared from the original oil starting material from which they are derived, but special procedures may be utilized for the removal of such naturally occurring oxidation inhibitors, such as distillation, fractional crystallization, liquid-liquid extraction or by other solvent extraction techniques, adsorption, etc. Oxidation inhibitors may also be removed or destroyed through the addition of peroxides, through the addition of pro-oxidants, through reaction with oxygen or other oxidizing agents at ordinary temperatures or at elevated temperatures, or by combination of any two or more of these treatments for varying lengths of time. When the inhibitors have been removed or destroyed, the sample can be further treated by oxidation to give the peroxides in accordance with the present invention.

The starting material may, therefore, be defined as an acid, ester or soap derived from a triglyceride oil substantially free from naturally occurring oxidation inhibitors.

In carrying out the reaction the starting material is subjected to the oxidizing effect of a gas comprising oxygen, such as air or oxygen or mixtures thereof, or mixtures of oxygen with other gases that do not readily react with the starting material, such as nitrogen or the rare gases.

The oxidizing reaction is accomplished by bubbling a gas comprising oxygen through the starting material while that material is maintained at a temperature within the range of 0° C. to 110° C. Below the lower limit of reaction temperature, the rate of reaction falls off greatly, whereas the upper limit of reaction is determined by the fact that if the temperature of reaction much exceeds 110° C. the rate of decomposition of the peroxides, which are formed in the oxidizing reaction, reaches a balance with the rate of peroxide formation. Therefore, it is undesirable to carry out the reaction at a temperature much exceeding 110° C., and it is undesirable to carry out the reaction at a temperature much below 0° C. Furthermore, at temperatures exceeding 110° C. there are formed considerable quantities of undesirable side-reaction products, such as ketones, aldehydes and acids.

The gas comprising oxygen is bubbled through the starting material at a temperature within the range stated, viz. about 0° C. to 110° C., until the peroxide value of the reaction mass reaches 50 to 3000 milliequivalents per kilogram. The peroxide value is determined by standard tests, such as the modification of Wheeler's peroxide method described by King, Roschen and Irwin, Oil and Soap, 10, 105 (1933).

The oxidizing reaction is somewhat selective, the constituents which are most unsaturated being first coverted to peroxides and later on, as these constituents are used up, the lesser saturated constituents being oxidized. When the lower limit of 50 milliquivalents per kilogram peroxide value is utilized, the peroxides of the more unsaturated constituents are produced predominately and the lower limit of oxidation, to wit the 50 milliequivalent limit, is useful for the practical production for special purposes of very pure peroxides of the most unsaturated constituents of the starting material.

Where greater purity is not desired and where a large yield of peroxide is desired, the reaction is carried to increasing high peroxide value levels, up to a peroxide value in the neighborhood of about 3000 milliequivalents per kilogram. By continuing the reaction to this upper limit it is possible to obtain mixtures of peroxides which are still not greatly contaminated by secondary reaction products, such as ketones, aldehydes and acids. Except in special cases, as when chlorophyll and slight are used to catalyze the reaction, if the reaction is carried much beyond the upper limit of 3000 milliequivalents per kilogram the undesirable reaction products, namely ketones, aldehydes and acids, are formed in undesirable amounts. Where chlorophyll and light are used as catalysts for the reaction the 3000 milliequivalent limit may be somewhat exceeded without bad results.

By carrying the reaction to approximately the 3000 milliequivalent limit the peroxides formed are a complex mixture of peroxides, including various geometric and other isomers of the peroxides of the various unsaturated acids or their derivatives contained in the starting materials.

In most cases the oxidation at lower temperatures will yield a more homogeneous product. However, at lower temperatures the rates of oxidation are also lower so that in practice the oxidation temperature to be selected will be determined by the consideration of such factors as the economy of the process in relation to the time required for the desired oxidation, and by the desired purity of the product.

Another factor is the relation of the selectivity of the oxidation to temperature. In general, the temperature coefficient of the oxidation rates of different fatty acids will be different and will depend also on the fatty acid composition of the mixture, so that the selectivity of the oxidation reaction may be improved by making a judicious selection of temperature.

Separation of the peroxides from the unreacted starting material can be accomplished in several ways.

Simple separation of the peroxides may be accomplished by using one non-polar solvent, such as a petroleum hydrocarbon solvent which dissolves the starting material but is a relatively poor solvent for the peroxides formed in the reaction, particularly at low temperatures. Thus, gasoline fractions such as Skellysolve F and other aliphatic and aromatic hydrocarbons are useful as a non-polar solvent for this purpose. After the oxidation reaction has been carried to completion there is added to the reaction mass a non-polar solvent, such as Skellysolve F, which is a solvent for the unoxidized material. The reaction mass to which the non-polar solvent has been added is then slowly chilled and the peroxides first precipitate out and may be removed from the remaining, predominately unoxidized materials which remain dissolved in the non-polar solvent.

By another method separation may be accomplished by using a polar solvent, such as methyl or ethyl alcohol and the like. Polar solvents are selective solvents for the peroxidized material. In such separatory methods the reaction mass is mixed with the polar solvent and the mass is slowly cooled until the unoxidized material separates out predominantly. Most of the oxidized material remains dissolved in the polar solvent. In this method the oxidized material may be removed as a solution in the polar solvent and may thereafter be recovered by evaporating the polar solvent therefrom. Among other polar solvents which may be used there may be mentioned acetone, diethyl carbonate, dioxane, etc.

A third method of separating the oxidized materials is by using a two-phase solvent including a polar solvent, such as methyl alcohol, and a non-polar solvent, such as gasoline (Skellysolve F). When utilizing this separatory procedure the reaction mass is mixed in a mixture of polar and non-polar solvents.

Since the unoxidized fatty acids, esters or other derivative starting materials are, in general, more soluble than their peroxides in non-polar solvents and since their peroxides are in general more soluble in polar solvents, it is possible to separate the peroxides from the undesired materials by partition between two immiscible solvents, one of which is polar and the other non-polar. Sometimes this separation can be facilitated by lowering of the temperature, thus increasing the immiscibility of the two phases. In many instances a mixture of a hydrocarbon solvent, such as Skellysolve F, and a non-polar solvent, such as methyl alcohol or any other simple alcohol, may be used advantageously. In some cases also it is advantageous to add a small portion of water to the alcohol. The alcohol layer is heavier and settles to the bottom of the container and may be drawn off.

Another method of separating the oxidized material is by the use of a hydrocarbon solvent, such as propane, which at ordinary room temperatures is liquid under pressure. In carrying out this method of separation, after the oxidizing reaction has been carried to completion, the reaction mass is dissolved in the hydrocarbon solvent while the latter is under pressure and hence liquefied. Then the temperature of the mass is slowly raised toward the critical temperature of the hydrocarbon solvent, and the peroxides are separated into a liquid phase from another liquid phase containing the solvent (for example, propane) and unoxidized material. In this way the oxidized materials may be separated.

In all of these cases of separation of the peroxides by means of solvents, it is permissible to mix the starting materials with the solvents before the oxidation reaction is carried out, if desired. The oxidation may then be conducted as previously described but in the presence of the solvent. Adequate precautions should be taken to prevent unnecessary loss of the solvent by evaporation during the oxidation.

Countercurrent methods of solvent separation may be used, if desired, in any of the aforesaid peroxide separation procedures when applicable.

It is an important feature of the invention to prepare selectively peroxides of various constituents in the reaction starting material by first reacting the material, then solvent separating the peroxides which have been formed, and then again reacting the material, again solvent separating and so on through a plurality of steps. It is an inherent property of the reaction of the present invention that generally oxidation occurs first in respect to those constituents of the starting material which have the highest degree of unsaturation. However, by choosing the proper catalysts, the reaction may be conducted so that the selectivity toward the more unsaturated constituents is greatly reduced, if desired. Thus, by bubbling the gas comprising oxygen through the reaction mass at a selected temperature within the aforestated range, it is possible first to obtain peroxides of the most unsaturated constituents. The reaction may then be stopped and these peroxides may be separated by solvent extraction in accordance with any of the aforesaid methods. The reaction is then resumed by bubbling the gas comprising oxygen through the reaction mass at the same or different temperature within the range aforesaid until a further constituent or constituents is oxidized. The reaction mass is then subjected again to separatory solvent extraction and these additional peroxides of the same or different constituents are then separated. The reaction may then be subjected to a third oxidizing reaction and at the termination thereof separation of the peroxides may be obtained. Fourth and subsequent reactions and separations may also be utilized, if desired, although this is not usually necessary in order to obtain fairly clean separation of the various desired oxidized constituents.

Thus, due to the inherent characteristics of the reacting ingredients and utilizing the methods of and according to the present invention, it is possible to obtain selective oxidation of various constituents of the starting material.

An example of the preferential or selective oxidation is noted in respect to the esters of the fatty acids of corn oil, in which there is a high proportion of linoleic acid and some oleic acid, together with some saturated acids. By first reacting the esters of corn oil fatty acids there is obtained predominantly peroxides of linoleic acid esters which can then be separated by the solvent extraction methods above described. The reaction mass is then again subjected to the oxidizing reaction and the oleic constituents are oxidized and these may likewise be separated. Reasonably clean separation of the linoleic ester peroxide and oleic ester peroxide can thus be obtained.

It may be pointed out that the preferential oxidation of higher unsaturated acids and their esters is favored by reaction at lower temperatures within the range stated.

The reaction can be carried out with or without catalysts. As catalysts there may be used materials such as heavy metals, heavy metal stearates, such as copper stearate or other heavy metal soaps, or organic catalysts, such as chlorophyll in the presence of actinic light. The addition of organic peroxides such as benzoyl peroxide, or, if desired, peroxides of fatty acids or fatty acid derivatives produced in a previous run, also has the effect of accelerating the reaction. As catalysts there may be used heavy metals and their derivatives, light, photochemical pigments plus light, biological oxidation catalyst, such as soybean lepoxidase. It is preferable to use light having a wave length of about 6700 angstrom units or less.

Some catalysts change the selectivity of oxidation whereas other catalysts do not. They are, therefore, used, and the selection of the catalyst made on the basis of whether selectivity or rapid oxidation is desired. Thus, copper stearate catalyst does not appreciably change the selectivity of the reaction but only accelerates the oxidation of all constituents in substantially the same proportion. By using copper catalysts, such as copper stearate, the oxidation of all of the unsaturated constituents is accelerated in about the same proportion and the effect of the catalyst is, therefore, one of producing rapid oxidation without selectivity.

By utilizing as the catalyst chlorophyll in the presence of actinic light, oxidation of lower unsaturated constituents is accelerated more than that of the high unsaturated constituents. Thus, where it is desired to accelerate the oxidation of constituents of lower unsaturation, this can be accomplished conveniently by utilizing chlorophyll as the catalyst in the presence of actinic light.

In some cases, particularly where the preparation of monomeric peroxides in relatively high concentrations is desired it is advantageous to carry out the oxidation in a solvent, which may be either polar or non-polar. The use of a solvent reduces the rate of decomposition or polymerization of the peroxides without appreciably reducing the rate of their formation, in some cases.

The invention is illustrated by the following examples in which all parts are proportions by weight unless otherwise stated. The examples must not be taken as defining the limits of the invention.

EXAMPLE I

*Methyl linoleate peroxide concentrates from relatively pure methyl linoleate*

This is an example of the preparation of a concentrate of methyl linoleate peroxides from a sample of relatively pure methyl linoleate prepared by a standard debromination procedure from tetrabromstearic acid. The tetrabromstearic acid had been prepared by the bromination of the free fatty acids of corn oil.

After the methyl linoleate had been purified by distillation, it was oxidized by a stream of air at a temperature between 3 and 6° C. until the peroxide value had reached 2500 milli-equivalents per kilogram. 25 grams of the oxidized material were dissolved in a mixture of 125 ml. of Skellysolve F and 125 ml. of absolute methyl alcohol. The mixture was cooled to minus 50° C. which resulted in a relatively complete separation of the two solvents. The methyl alcohol fraction was drawn off, and subsequently equilibrated with 4 additional 125 ml. portions of Skellysolve F at minus 50° C. The methyl alcohol fraction was then evaporated and the residual material was found to have the following characteristics:

The specific extinction coefficient used herein is defined as the spectral density of a 1 cm. layer of solution having a concentration of one gram of the material per liter, compared with an equal layer of solvent. In mathematical terms the specific extinction coefficient is defined as $$\log_{10} \frac{I_0}{I_x} \Big/ cl$$

where $I_0$ equals intensity of incident light, $I_x$ equals intensity of emergent light, $c$ equals concentration of soluiton in grams per liter and $l$ equals thickness of absorbing layer of solution. Throughout the present specification and claims the specific extinction coefficient was determined in this manner.

Specific extinction coefficient at 2325 angstrom units_____ 62.1
(This is about 97% of the maximum expected value under these conditions for a peroxide concentrate containing 100 mol. per cent of peroxide).
Peroxide value_milliequivalents/kilogram__ 5990
(This is 98% of the theoretical peroxide value for a methyl linoleate peroxide concentrate containing 100 mol. per cent of peroxide).
Yield of peroxide concentrate_____gm__ 8.85
(This represents 85% of the peroxides present in the original oxidized mixture).

EXAMPLE II

*Methyl oleate peroxide concentrate from methyl oleate*

In this example methyl oleate was used as the starting material. It was relatively pure. 15 grams of methyl oleate were oxidized by blowing through it air at a temperature of 37.5° C. until the peroxide value, as determined by test, was 1020 milliequivalents per kilogram. The oxidized material was seperated by mixing the reaction mass with methyl alcohol and Skellysolve F in equal proportions, as in Example I, except that the separation was accomplished at minus 40° C. rather than minus 50° C. The peroxide concentrate which was contained in the methyl alcohol had a peroxide value of 6670 milliequivalents per kilogram, which is slightly more than 100 mol. per cent of peroxide oxygen. The specific extinction coefficient of the product at 2325 angstrom units was negligible compared with the absorption of linoleate peroxides.

EXAMPLE III

*Methyl linoleate peroxide concentrate prepared from a methyl oleate-methyl linoleate mixture*

In this example the starting material was a mixture of equal amounts of methyl oleate and methyl linoleate, and the example particularly exemplifies the preferential oxidation of methyl linoleate in the presence of methyl oleate.

A mixture of 50 grams of purified methyl oleate and 50 grams of methyl linoleate prepared by debromination of tetrabromstearic acid was oxidized by bubbling air therethrough for 17½ hours at 53° C. At the end of the reaction period the peroxide value was 570 milliequivalents per kilogram as determined by test. The oxidized constituents were separated by using Skellysolve F and methyl alcohol, as in Example I, except that a temperature of 40° C. was used. The product obtained had the following characteristics:

Specific extinction coefficient at 2325 angstrom units was 68.1. The expected maximum specific extinction coefficient for 100 mol per cent methyl linoleate peroxide is 69.6 calculated from the data given by Bolland Koch, Journal of the Chemical Society, 1945, p. 445. The product had a peroxide value of 7140 milliequivalents per kilogram as compared with a theoretical value of 6130 milliequivalents per kilogram for a 100% pure methyl linoleate monoperoxide. The results obtained indicates that the methyl linoleate was preferentially oxidized with almost no oxidation of the oleate taking place. The peroxide value also showed that it is possible to prepare methyl linoleate peroxide concentrates that contain more than 100 mol per cent peroxide oxygen.

EXAMPLE IV

*Peroxide concentrates from methyl oleate-methyl linoleate mixtures*

This example illustrates the relationship between various conditions of oxidation, various ratios of oleate-linoleate concentrations, and the nature of the peroxides formed. The table summarizes the data obtained and tabulates the ratios of the specific extinction coefficients at 2325 angstrom units to the peroxide value in the peroxide concentrations that were obtained.

SPECIFIC EXTINCTION COEFFICIENT AT 2325 ANGSTROM UNITS DIVIDED BY THE PEROXIDE VALUE

| Ratio—Linoleate To Oleate | Temp. 53° | Temp. 53°, Cu Catalyst | Temp. 100° | Temp. 15°, Chlorophyll plus light |
|---|---|---|---|---|
| 25 to 75 | .0097 | .0096 | .0057 | .0031 |
| 50 to 50 | .0101 | .0103 | .0086 | .0042 |
| 75 to 25 | .0116 | .0106 | .0105 | .0075 |
| 100 to 0 | .0124 (40°) | .0112 (40° C.) | .0124 | .0125 (20° C.) |

It will be seen that at any given temperature the ratio of the extinction values to peroxide values increases with the concentration of linoleate in the mixture. Since only the linoleate peroxides have an appreciable absorption at 2325 angstrom units, the data show that the process of oxidation is largely selective for linoleate peroxides but also that there is some oxidation of the oleate. Comparing columns 2 and 4, it will be seen that the selectivity is favored by oxidation at lower temperatures. Column 3 indicates that the use of a copper catalyst does not alter the selectivity of the oxidation appreciably at 53° C. Column 5 shows that when chlorophyll and light are used to catalyze the oxidation reaction, the selectivity of the oxidation is greatly reduced. This type of catalysis may be useful in obtaining mixtures of oleate and linoleate peroxides from methyl esters of natural oils.

EXAMPLE V

*Methyl linoleate peroxide concentrate prepared by oxidation of methyl linoleate in a solvent*

This example concerns a case where a solvent was used during the oxidation step. One part methyl linoleate was dissolved in three parts of Octoil S and oxidized by bubbling air through the mixture at 37.5° C. until the mixture had a peroxide value of 2010 milliequivalents per kilogram. The presence of the solvent did not appear to decrease the rate of oxidation appreciably. The peroxides separated by partition using Skellysolve F and methyl alcohol at minus 40° C. were found to have the following constants:

Specific extinction coefficient at 2325 angstrom units _____ 63.0
Peroxide value__milliequivalents/kilogram__ 6490

Other physical characteristics of this peroxide concentrate indicated that there had occurred appreciably less polymerization and decomposition than in other samples prepared under the same conditions but in the absence of solvents.

EXAMPLE VI

*Molecular weights of methyl linoleate concentrates*

This example illustrates the relationship between the average molecular weight of the peroxides obtained and some of the conditions of oxidation. The theoretical molecular weight for a methyl linoleate monoperoxide is 326. The molecular weights recorded in the following illustrative cases were measured by a cryoscopic method using benzene as the solvent:

| Material | Extent of Oxidation—Peroxide Value in Milliequivalents per Kilogram | Molecular Weight |
| --- | --- | --- |
| 1. Methyl esters of corn oil acids oxidized at 53° C | 690 | 411 |
| 2. Methyl esters of corn oil acids oxidized at 53° C | 1,120 | 471 |
| 3. Methyl esters of corn oil acids oxidized at 53° C | 1,996 | 493 |
| 4. Methyl Oleate-methyl linoleate (1–1) oxidized at 53° C | 1,042 | 501 |
| 5. Methyl linoleate oxidized at 53° C | 116 | 326 |
| 6. Methyl linoleate oxidized at 0° C | 478 | 470 |

The data show that as the level of oxidation is increased, the extent of polymerization in the peroxides is also increased. It is also seen that when pure linoleate is oxidized at low temperature, the extent of polymerization may be appreciable, even though the level of oxidation is not high.

EXAMPLE VII

*Methyl linoleate peroxide concentrate from corn oil esters*

This is an example of the preparation of a methyl linoleate peroxide concentrate using a natural oil as the starting material. A sample of corn oil was saponified and the methyl esters of the fatty acids prepared. A portion of the more saturated esters was removed by crystallization from petroleum ether at 40° C. No attempt was made in this case to remove unsaponified fractions or any oxidation inhibitors. Some of the analytical constants for the methyl esters that were used were as follows:

Iodine value (Wijs) _____ 132.5
Acid number _____ 2.23
Methyl oleate _____ Approx. 45%
Methyl linoleate _____ Approx. 55%

These methyl esters were then divided into several portions and oxidized with air under various conditions. They gave various products, as shown in the following table. It may be seen in the table that high concentrations of methyl linoleate peroxides may be made by a selective oxidation of the methyl esters of corn oil.

| Oxidation Treatment | Level of Oxidation, Milliequivalents Per Kilogram | Product | |
| --- | --- | --- | --- |
| | | P. V., m. eq./kg. | Specific Extinction Coefficient at 2335 Å. |
| Blown with air 6 days at 37.5° C | 690 | 5,210 | 66.0 |
| Blown with air 66.5 hours at 37.5° C. in presence of .00016% copper | 780 | 5,610 | 59.9 |
| Blown with air 42.5 hours at 37.5° C. in presence of .0016% copper | 996 | 4,790 | 50.7 |
| Blown with air at 37.5° C. under ultra-violet light | 1,466 | 5,140 | 42.6 |
| Blown with air at 100° C. to P. V. 597, then 12 days at 25° C | 1,960 | 4,270 | 28.6 |

The oxidation may be accelerated either by the addition of copper stearate catalyst or by the use of ultraviolet light. In other examples it has been found that it is advantageous to remove the inhibitors of oxidation by extraction during the saponification procedure. In such cases the addition of copper further accelerates the oxidation.

The table shows that when a temperature of 100° C. is used for the oxidation, a high concentration of peroxide may still be obtained but the specific extinction coefficient at 2325 angstrom units is considerably reduced, which suggests that at these higher temperatures the oxidation is less selective and also that there may be some destruction of conjugated double bond systems by polymerization or other secondary reactions.

EXAMPLE VIII

*Concentrate of mixed peroxides of esters of soybean oil acids*

This is an example of the preparation of a peroxide concentrate using soybean oil methyl esters as the starting material. 200 grams of esters were dissolved in 100 ml. of Skellysolve F and filtered through a column of activated alumina to remove a portion of the natural inhibitors. The solution was then aerated at 43° C. until a peroxide value of 215 milliequivalents per kilogram had been reached. Methanol was then added in equal volume and the solution cooled to minus 45° C. The Skellysolve fraction was removed and additional extractions of the unoxidized materials were made with Skellysolve F. After evaporation of the methyl alcohol from the peroxide fractions, the specific extinction coefficient was found to be 65.3 which corresponds closely to what would be expected for a mixture of linoleate and linolenate peroxides. No further studies of this product were made.

EXAMPLE IX

*Concentrate of mixed peroxides of methyl esters of linseed oil acids*

This is an example of the preparation of a peroxide concentrate starting with the methyl esters of linseed oil. The esters were dissolved in acetone and the saturated fatty acid esters removed by precipitation at minus 50° C. Decolorizing charcoal was used to remove a portion of the pigment and antioxidants. The material then had an iodine value of 221 and further analyses indicated that it consisted of approximately 55.3 per cent methyl linolenate and 44.7 per cent methyl linoleate. 150 grams of these esters were oxidized to a peroxide level of 1350 milliequivalents per kilogram. The oxidation was conducted at 100° C. for three hours to rapidly destroy any remaining inhibitors, and thereafter the oxidation was conducted at room temperature. The peroxides were separated by partition between methyl alcohol and Skellysolve F at minus 40° C., and were found to have the following characteristics:

Specific extinction coefficient at 2325 angstrom units _____ 38.1
Peroxide value__milliequivalents/kilogram_ 6000

The low value for the specific extinction coefficient in this case suggests partial destruction of conjugated double bond systems by polymerization and other reactions, at the same time yielding a product with a high concentration of peroxide oxygen.

EXAMPLE X

*Peroxide concentrate prepared by oxidation of the soaps of linoleic acids of corn oil*

Fatty acids of corn oil were first prepared in accordance with known procedures and were then preliminarily fractionated in acetone at minus 22° C. and at minus 50° C. to produce a concentrate of linoleic acid. The fatty acids were converted to potassium soaps by treatment with potassium hydroxide and the resultant soaps contained about 90% potassium linoleate.

65 grams of the so prepared potassium linoleate soaps were made up to a volume of about 600 ml. in water. 0.330 gram of commercial chlorophyll was added and the mixture was placed at an average distance of about 1 foot from a 200-watt incandescent lamp and air blown through the mixture for 18 hours at room temperature, i. e. 18°–20° C. The reaction was continued until, by testing, it was determined that the oxidized soap had a peroxide value of 657 milliequivalents per kilogram. The reaction mass was then acidified with approximately 10% more than the stoichiometrically required amount of hydrochloric acid and the thus liberated fatty acids were taken up in diethyl ether. The ether was removed from residue by evaporation and the residue was then partitioned by adding 650 ml. of Skellysolve F and 650 ml. of methyl alcohol and cooling to minus 50° C. At this temperature the mixture separated into two distinct liquid fractions, namely a methyl alcohol fraction and a Skellysolve fraction. The methyl alcohol fraction was equilibrated with 4 additional 650 ml. portions of Skellysolve F at minus 50° C. The peroxides in the methyl alcohol fraction were then transferred to 200 ml. of diethyl ether, and 5 grams of decolorizing charcoal were added. The solution was filtered and evaporated to dryness, yielding 7.0 grams of peroxide concentrate. The characteristics of the peroxide concentrate were as follows:

Peroxide value_____milliequivalents/kg__ 2430
Specific extinction coefficient at 2325 angstrom units _____ 27.3

It will be noted that the relative proportions of methyl alcohol and Skellysolve F used in the separation procedure were somewhat greater than were used in the examples where the peroxides of the methyl esters of the fatty acids were prepared. Because of the greater solubilizing effect of the free fatty acids, it is necessary to use larger quantities of the solvents, and a lower temperature for the separation of the free fatty acid peroxides.

EXAMPLE XI

*Preparation of peroxide concentrate by oxidation of free fatty acids of a concentrate of linoleic acid prepared from corn oil*

0.156 gram of commercial chlorophyll was added to 75 grams of a 90 per cent concentrate of linoleic acid prepared from corn oil. This was irradiated at an average distance of 1 foot from a 200-watt incandescent light and blown with air for 30 hours at room temperature (i. e. 18°–20° C.). At the end of this time the peroxide value was 247 milliequivalents per kilogram. 575 ml. each of Skellysolve F and methyl alcohol were added and the mixture was equilibrated at minus 50° C. The methyl alcohol fraction was separated and equilibrated four additional times with 375 ml. portions of Skellysolve F at minus 50° C. After removing the chlorophyll on decolorizing charcoal, the peroxide concentrates were freed from solvent and found to have the following characteristics:

Peroxide value_____milliequivalents/kg__ 671
Specific extinction coefficient at 2325 angstrom units _____ 7.31

It may be noted that, generally speaking, it is more difficult to obtain high peroxide values during the oxidation of free fatty acids, and also more difficult to separate the resultant peroxide concentrate having a high peroxide value.

EXAMPLE XII

*Preparation of peroxide concentrate using another separation technique*

100 grams of methyl esters of fatty acids of linseed oil were oxidized by blowing with air for three hours at 100° C. and then subsequently at room temperature until a peroxide value of 1200 milliequivalents per kilogram had been attained. The product was dissolved in 1000 ml. of Skellysolve F and the solution was allowed to stand at minus 18° C. over night. An oil deposit collected on the bottom of the container. This was separated and the solvent remaining in it was removed by evaporation. The product had the following characteristics:

Peroxide value_____milliequivalents/kg__ 4770
Specific extinction coefficient at 2325 angstrom units _____ 10.8
Specific extinction coefficient at 2680 angstrom units _____ 2.10

EXAMPLE XIII

*Preparation of peroxide concentrate by using the residue unoxidized material from previous run*

100 grams of a concentrate of methyl esters of unsaturated corn oil fatty acids were oxidized by blowing with air at 53° C. until a peroxide value of 486 milliequivalents per kilogram had been attained. To this was added 500 ml. of methyl alcohol and 500 ml. of Skellysolve F. After equilibration at minus 40° C. the methyl alcohol fraction was separated and washed with four additional 500 ml. portions of Skellysolve F at minus 40° C. The solvent was removed from the methyl alcohol fraction, and a product with the following characteristics was obtained:

Peroxide value_____milliequivalents/kg__ 5810
Specific extinction coefficient at 2325 angstrom units_____ 64.5

The Skellysolve F fractions from the above run were combined and the Skellysolve F removed by evaporation. The residue was oxidized by blowing with air for 16 hours at 53° C. until a peroxide value of 332 milliequivalents/kg. had been attained. This product was partitioned between methyl alcohol and Skellysolve F the same as before. A peroxide concentrate was isolated and had the following characteristics:

Peroxide value_____milliequivalents/kg__ 5750
Specific extinction coefficient at 2325 angstrom units_____ 62.2

The above process of oxidation and separation was repeated several times. Finally following the fifth oxidation of the residues and separation of the oxidized materials, a product was obtained with the following characteristics:

Peroxide value_____milliequivalents/kg__ 5240
Specific extinction coefficient at 2325 angstrom units_____ 7.1

These data show that the product obtained consisted primarily of methyl oleate peroxides.

The foregoing examples demonstrate the wide variety of peroxide concentrates that may be obtained under various conditions with various starting materials. It is apparent from the examples that have been given that great selectivity in the oxidation step may be obtained by proper selection of starting materials and oxidizing conditions. It is also apparent that the nature of the product may be varied as desired, within limits. Thus, such conditions as temperature, presence or absence of inhibitors and the presence or absence of catalysts, such as metals, light, chlorophyll and light, oxidation in a solvent etc. alter the character of the products obtained, as desired and these factors are, therefore, utilized and selected so as to produce the desired oxidizing effect and product.

The term peroxide, as used in the present specification and claims, is intended to include the reaction product of the named starting materials and a gas comprising oxygen, which reaction product will liberate iodine from potassium iodide under the conditions of the method of determining peroxides described in the article by Lundberg and Chipault, Journal of the American Chemical Society 69; pp. 833-836; 1947. The peroxides described in the foregoing specification and herein claimed fulfill such requirements. The term peroxide concentrate used in the instant specification and claims is intended to include concentrates of the aforesaid peroxides obtained by the removal of unreacted material from the reaction mass.

As many apparently widely different embodiments of this invention may be made without departing from the spirit and scope thereof, it is to be understood that I do not limit myself to the specific embodiments herein.

What I claim is:

1. The method of preparing peroxide concentrates which comprises reacting a starting material selected from the class consisting of fatty acids and the soaps and mono-hydric alcohol esters thereof with a gas containing oxygen at a temperature in the range of 0° C. to 110° C. until the peroxide value of the reaction mass is in the range of about 50 to 3000 milliequivalents per kilogram and without the substantial formation of aldehydes, ketones or acids, partitioning the reaction mixture between a polar solvent and a non-polar solvent to yield a peroxide concentrate in the polar solvent.

2. The method of preparing peroxide concentrates which comprises reacting a starting material selected from the class consisting of fatty acids and the soaps and mono-hydric alcohol esters thereof with a gas containing oxygen at a temperature in the range of 0° C. to 110° C. until the peroxide value of the reaction mass is in the range of about 50 to 3000 milliequivalents per kilogram and without the substantial formation of aldehydes, ketones or acids, adding a petroleum hydrocarbon solvent and methanol to the reaction mixture, cooling the reaction mixture to effect phase separation between a solution of the peroxides in the polar solvent and a solution of the unoxidized material in the hydrocarbon solvent, and separating the two phases.

3. The method of preparing peroxide concentrates which comprises reacting a starting material selected from the class consisting of fatty acids and the soaps and mono-hydric alcohol esters thereof with a gas comprising oxygen at a temperature in the range of about 0° C. to 110° C. until the peroxide value of the reaction mass is in the range of about 50 to 3000 milliequivalents per kilogram and without the substantial formation of aldehydes, ketones or acids, effecting solvent fractionation of the peroxidized material from the unoxidized material and subjecting the unoxidized material to further oxidation within said temperature range for the production of peroxides from other constituents of the starting material.

4. The process of producing peroxide concentrates from a natural fat which comprises converting said fat to a mixture of compounds selected from the group consisting of fatty acids and the soaps and mono-hydric alcohol esters thereof, fractionating said mixture to remove a substantially saturated fraction therefrom and to leave an unsaturated fraction, subjecting the unsaturated fraction to reaction with a gas comprising oxygen at a temperature in the range of about 0° C. to 110° C. until the peroxide value of the reaction mass is in the range of about 50 to 3000 milliequivalents per kilogram and without the substantial formation of aldehydes, ketones or acids, adding a mixture of a polar and a non-polar solvent to the resultant reaction mixture, and partitioning the reaction mixture between the polar and non-polar solvents to recover a peroxide concentrate in the polar solvent.

5. The method of preparing peroxide concentrates which comprises reacting a starting material selected from the class consisting of fatty acids and the soaps and mono-hydric alcohol esters of such acids with a gas comprising oxygen at a temperature in the range of about 0° C. to 110° C. until the peroxide value of the reaction mass is in the range of about 50 to 3000 milliequivalents per kilogram and without the substantial formation of aldehydes, ketones and acids, and thereafter subjecting the reaction mixture to solvent fractionation to separate a peroxide concentrate from the unoxidized material, said process being further characterized in that the oxidized constituents are separated from the reaction mixture at the termination of the reaction by mixing the reaction mass with a hydrocarbon solvent under pressure and then gradually elevating the temperature of the mixture to the critical temperature of the solvent and then separating the thus separated phase of oxidized constituents.

6. The process of claim 5 further characterized in that the hydrocarbon solvent is propane.

7. The method of preparing peroxide concentrates which comprises reacting a starting material selected from the class consisting of fatty acids and the soaps and mono-hydric alcohol esters of such acids with a gas comprising oxygen in the presence of chlorophyll and light at a temperature in the range of 0° C. to 110° C. until the peroxide value of the reaction mass is in the range of about 50 to 3000 milliequivalents per kilogram and without the substantial formation of aldehydes, ketones or acids, and thereafter subjecting the reaction mixture to solvent fractionation to separate the peroxide concentrate from the unoxidized material.

WALTER O. LUNDBERG.

References Cited in the file of this patent

UNITED STATES PATENTS

| Number | Name | Date |
|---|---|---|
| 1,794,325 | Scholz | Feb. 24, 1931 |
| 1,975,672 | Vahlteich | Oct. 2, 1934 |
| 1,994,992 | Haas | Mar. 19, 1935 |
| 2,044,007 | Long | June 16, 1936 |
| 2,059,259 | Long | Nov. 3, 1936 |
| 2,072,151 | Bonney | Mar. 2, 1937 |
| 2,141,885 | Straus | Dec. 27, 1938 |

FOREIGN PATENTS

| Number | Country | Date |
|---|---|---|
| 24,103 | Great Britain | 1894 |

OTHER REFERENCES

"Cottonseed and Cottonseed Products," by A. E. Bailey, page 389, 1948 ed. Interscience Publishers, Inc., New York, publishers.